United States Patent [19]
Skidmore et al.

[11] Patent Number: 5,945,000
[45] Date of Patent: Aug. 31, 1999

[54] METHODS OF PURIFYING PHOSPHORIC ACID

[75] Inventors: Howard J. Skidmore, Chubbuck, Id.; Klaas J. Hutter, Tampa, Fla.

[73] Assignee: J. R. Simplot Company, Pocatello, Id.

[21] Appl. No.: 09/017,525

[22] Filed: Jan. 2, 1998

[51] Int. Cl.⁶ .............................. C01B 25/16; B01D 61/00
[52] U.S. Cl. ........................ 210/650; 210/651; 423/321.1
[58] Field of Search ......................... 423/321.1; 210/650, 210/651, 500.38

[56] References Cited

U.S. PATENT DOCUMENTS

| | | | |
|---|---|---|---|
| 4,769,148 | 9/1988 | Fibiger et al. | 210/500 |
| 4,857,211 | 8/1989 | Nineuil et al. | 423/321.1 |
| 5,154,829 | 10/1992 | Degen et al. | 210/500.38 |
| 5,318,707 | 6/1994 | Rey et al. | 423/321.1 |
| 5,547,579 | 8/1996 | Brown | 210/651 |
| 5,587,083 | 12/1996 | Twardowski | 210/651 |
| 5,685,990 | 11/1997 | Saugmann et al. | 210/650 |
| 5,693,231 | 12/1997 | Johnson et al. | 210/651 |

*Primary Examiner*—Wayne Langel
*Attorney, Agent, or Firm*—Wells, St. John, Roberts, Gregory & Matkin, P.S.

[57] ABSTRACT

In one aspect, the invention includes a method of purifying phosphoric acid comprising filtering a feed solution of phosphoric acid through a membrane, wherein the feed solution is maintained at a temperature of from about 30° F. to about 90° F. during the filtering. In another aspect, the invention includes a method of purifying phosphoric acid comprising: a) providing a feed solution of phosphoric acid, said feed solution comprising greater than 17,000 ppm on a 100% $P_2O_5$ basis of each of Al, Fe and Mg; and b) filtering the feed solution through a polyamide filter configured for nanofiltration, the filtering comprising a temperature of from about 30° F. to 90° F., and a pressure of from about 600 psig to about 1000 psig to form a purified phosphoric acid solution, the purified phosphoric acid solution comprising less than 1700 ppm on a 100% $P_2O_5$ basis of each of Al, Fe and Mg.

11 Claims, 5 Drawing Sheets

METHODS OF PURIFYING PHOSPHORIC ACID

TECHNICAL FIELD

The invention pertains to methods of purifying phosphoric acid.

BACKGROUND OF THE INVENTION

The majority of phosphoric acid is produced by the so-called wet process method, whereby phosphate rock is reacted or acidulated with sulfuric acid to produce phosphoric acid and calcium sulfate. The wet process methods are further classified by the type of calcium sulfate produced. The dihydrate processes produce calcium sulfate dihydrate (gypsum) and a phosphoric acid solution containing typically 22% to 32% $P_2O_5$. The hemihydrate processes produce a stronger phosphoric acid solution (35–50% $P_2O_5$) and produce calcium sulfate in the hemihydrate form. Typically, the dilute phosphoric acid solutions are concentrated by evaporation and processed into a variety of phosphate containing fertilizers.

Phosphate rocks contain a wide variety of impurities that either completely or partially dissolve in the phosphoric acid solution when the phosphate rock is acidulated. The phosphoric acid solutions are relatively high in impurities such as aluminum, iron, magnesium and furthermore may contain elevated levels of heavy metals such as vanadium, chromium, cadmium, nickel, etc. The presence of these impurities render the phosphoric acid unsuitable for certain uses, such as, for example, use in metal treatment, food ingredients or for use in the production of sodium tripolyphosphate and other potassium and sodium phosphates.

Present methods for purifying the wet process phosphoric acid solution, for example, through the use of solvent extraction processes or through chemical precipitation, add substantially to the expense of manufacturing a phosphoric acid solution sufficiently low in impurities to render it suitable for use in, for example, water treatment, food ingredients or the production of sodium and potassium phosphates.

The present invention is concerned with a low cost method for purifying phosphoric acid, particularly phosphoric acid produced by the so-called wet process method. It should be noted, however, that the herein described process may also be used for the purification of phosphoric acid produced by other methods.

It has been proposed that the metallic impurities can be removed from impure phosphoric acid by membrane filtration. Specifically, the metallic impurities can be removed as metal ion complexes (e.g., as sulfate and phosphate complexes) with nanofiltration membranes. Nanofiltration membranes have pore sizes of from about 0.001 microns to about 0.01 microns, and can comprise, for example, a molecular weight cutoff of about 200 atomic mass units (amu).

Nanofiltration membranes are known in the art, and are available with a number of different chemical constituencies. Chemical constituencies having particular application for the purification of phosphoric acid solutiods are those of the general class of compounds known as polyatnides.

Although polyamide-based membranes have been proposed for the purification of phosphoric acid solutions, such membranes have been found to suffer an unacceptably rapid performance degradation when utilized in such applications. Accordingly, it is desirable to develop new methods of phosphoric acid purification utilizing nanofiltration membranes which avoid such rapid degradation of polyamide-based membranes.

A prior art nanofiltration filter element 10 is described with reference to FIG. 1. Element 10 is a so-called "spiral wound" filter apparatus, in that the nanofiltration membrane sheets are wound around a center core (permeate collection tube) of the element. Element 10 comprises a perforated central core 12 and a plurality of flat membrane sheets 14 wound around central core 12. Membrane sheets 14 have low pressure sides and high pressure sides, with the high pressure side being the side exposed to a pressurized feed solution. The low pressure sides are separated by a permeate spacer material to allow the collection and transport of the filtered phosphoric acid solution (also called permeate). Membrane sheets 14 are separated by support material 16 (material 16 is a so-called "brine spacer"). An outer shell 18 encases membrane sheets 14 and support material 16. Membrane sheets 14 can comprise, for example, polyamide-based materials. Support materials 16 and perforated central tube 12 can comprise, for example, polysulfone-based materials.

In operation, a flow of crude phosphoric acid feed solution 20 enters into membrane sheets 14 and passes longitudinally through filter element 10. The feed solution is under sufficient hydraulic pressure to force a phosphoric acid filtrate to the low pressure side of membrane sheets 14. The filtrate then flows radially and longitudinally to the permeate collection tube 12.

Preferably, the flow through element 10 is at a pressure of from about 300 pounds per square inch gauge (psig) to about 2000 psig, and will be at a temperature of at least 110° F. The high temperature reduces a viscosity of the acid to enable a reasonable flow of filtrate through element 10 and to reduce solution feedside pressure drop to minimize "telescoping" of the membrane sheets 14. The membrane elements are operated in a so-called cross-flow mode to minimize the build-up of rejected impurities at the membrane surfaces.

A flow rate through element 10 can be less than about 100 gallons per minute (gpm). As the phosphoric acid passes through element 10, it permeates membranes 14 and enters perforated central core 12 whereupon it is expelled as a purified phosphoric acid solution 22. The remainder of the feed phosphoric acid solution 20 is expelled as a non-purified solution 24. Non-purified solution 24 will typically comprise the vast majority of the contaminating metal ions of feed solution 20.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In one aspect, the invention encompasses a method of purifying phosphoric acid comprising filtering a feed solution of phosphoric acid through a membrane, wherein the feed solution is maintained at a temperature of from about 30° F. to about 90° F. during the filtering.

In another aspect, the invention encompasses a method of purifying phosphoric acid comprising:

providing a feed solution of phosphoric acid, said feed solution comprising a metal ion impurity; and filtering the feed solution through a membrane to form a permeate solution and a raffinate solution, the permeate solution comprising phosphoric acid and the raffinate solution comprising at least about 90% the metal ion impurity, the filtering comprising a temperature of from about 30° F. to about 90° F.

In yet another aspect, the invention encompasses a method of purifying phosphoric acid comprising:

providing a feed solution of phosphoric acid, said feed solution comprising greater than 17,000 ppm on a 100% $P_2O_5$ basis of each of Al, Fe and Mg; and filtering the feed solution through a polyamide filter configured for nanofiltration, the filtering comprising a temperature of from about 30° F. to 90° F., and a pressure of from about 600 psig to about 1000 psig to form a purified phosphoric acid solution, the purified phosphoric acid solution comprising less than 1700 ppm on a 100% $P_2O_5$ basis of each of Al, Fe and Mg.

Figure 2:
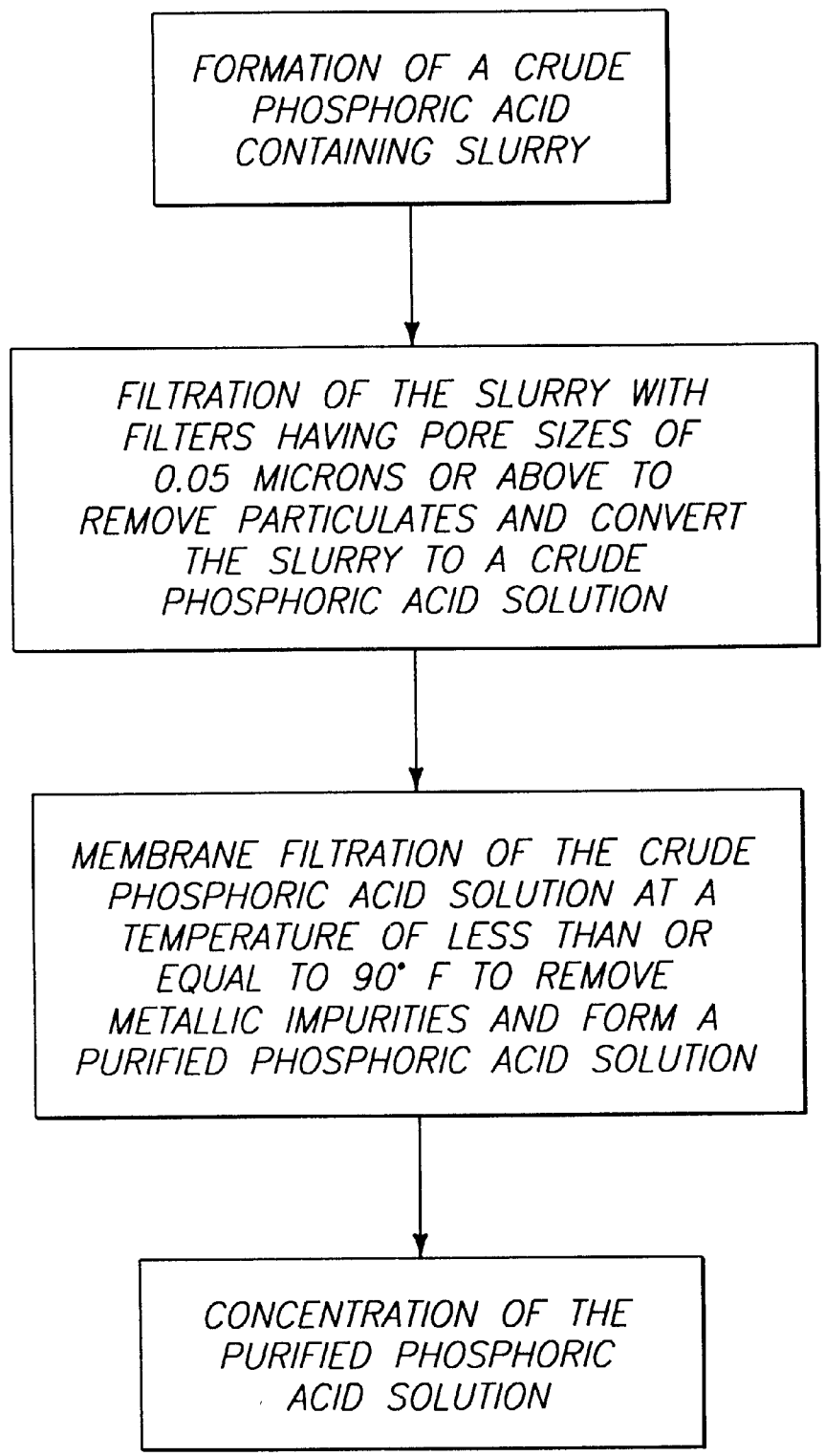
FIG. 2 is a flow diagram of a process of the present invention.

A process of the present invention is described with reference to FIGS. 2–5. Referring first to FIG. 2, a flow diagram of the process is shown. The process begins by forming a crude phosphoric acid slurry contaminated with various metal ions. The slurry can, for example, be formed by the wet process method described in the "Background" of this disclosure.

The slurry is filtered with one or more filters having pore sizes of 0.05 microns or above to remove particulates and suspended solids from the slurry, and to thereby convert the slurry to a crude phosphoric acid solution.

The phosphoric acid solution is then subjected to membrane filtration at a temperature of less than or equal to about 90° F. to remove metallic impurities and to thereby form a purified phosphoric acid solution. The membrane filtration preferably comprises nanofiltration.

The purified phosphoric acid solution is then concentrated by, for example, evaporation of water, to form a solution having, for example, from 75% $H_3PO_4$ to 80% $H_3PO_4$.

Figure 1:
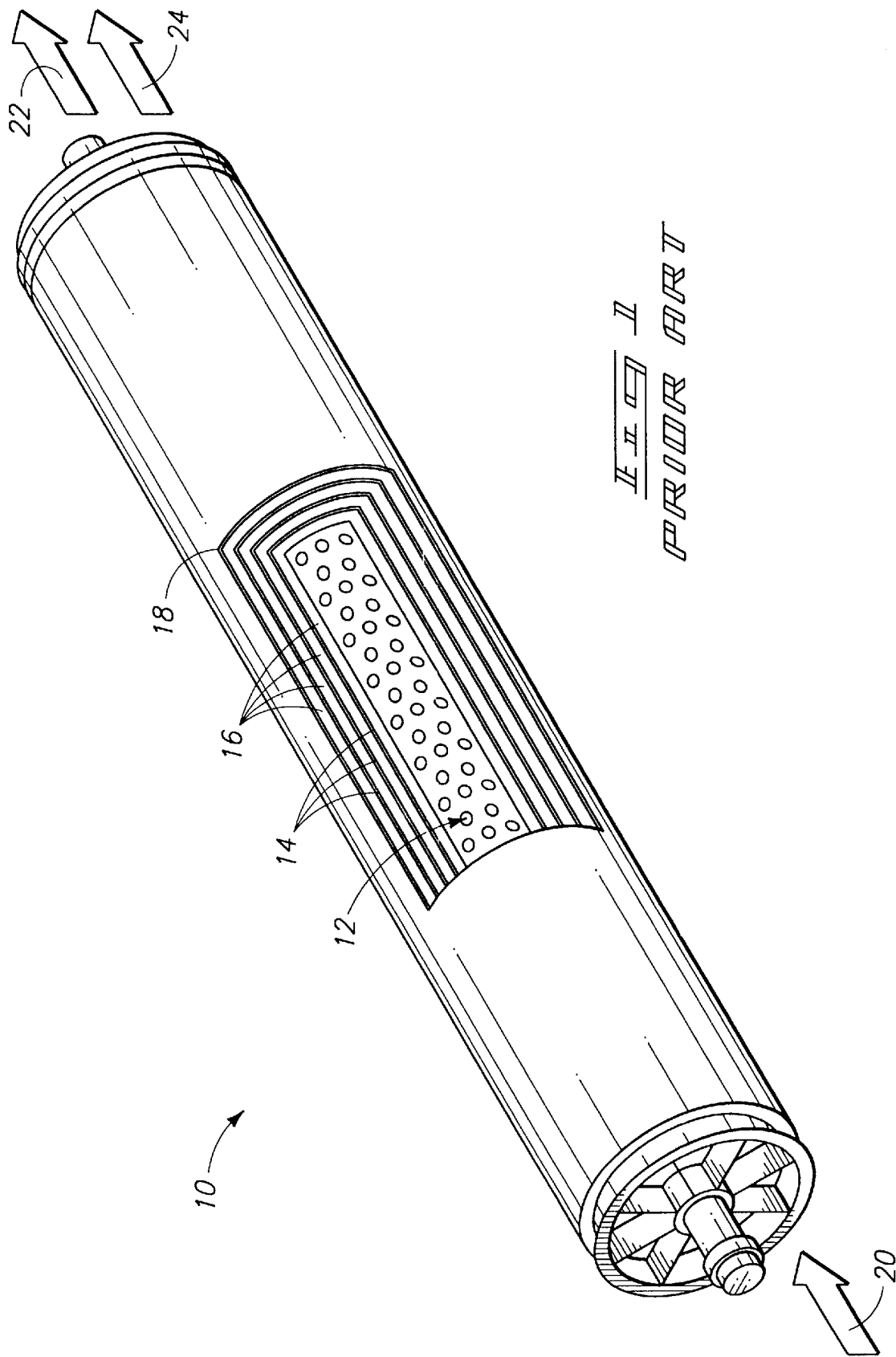
FIG. 1 is a diagrammatic, partial cross-sectional view of a prior art nanofiltration filter apparatus.
Figure 3:
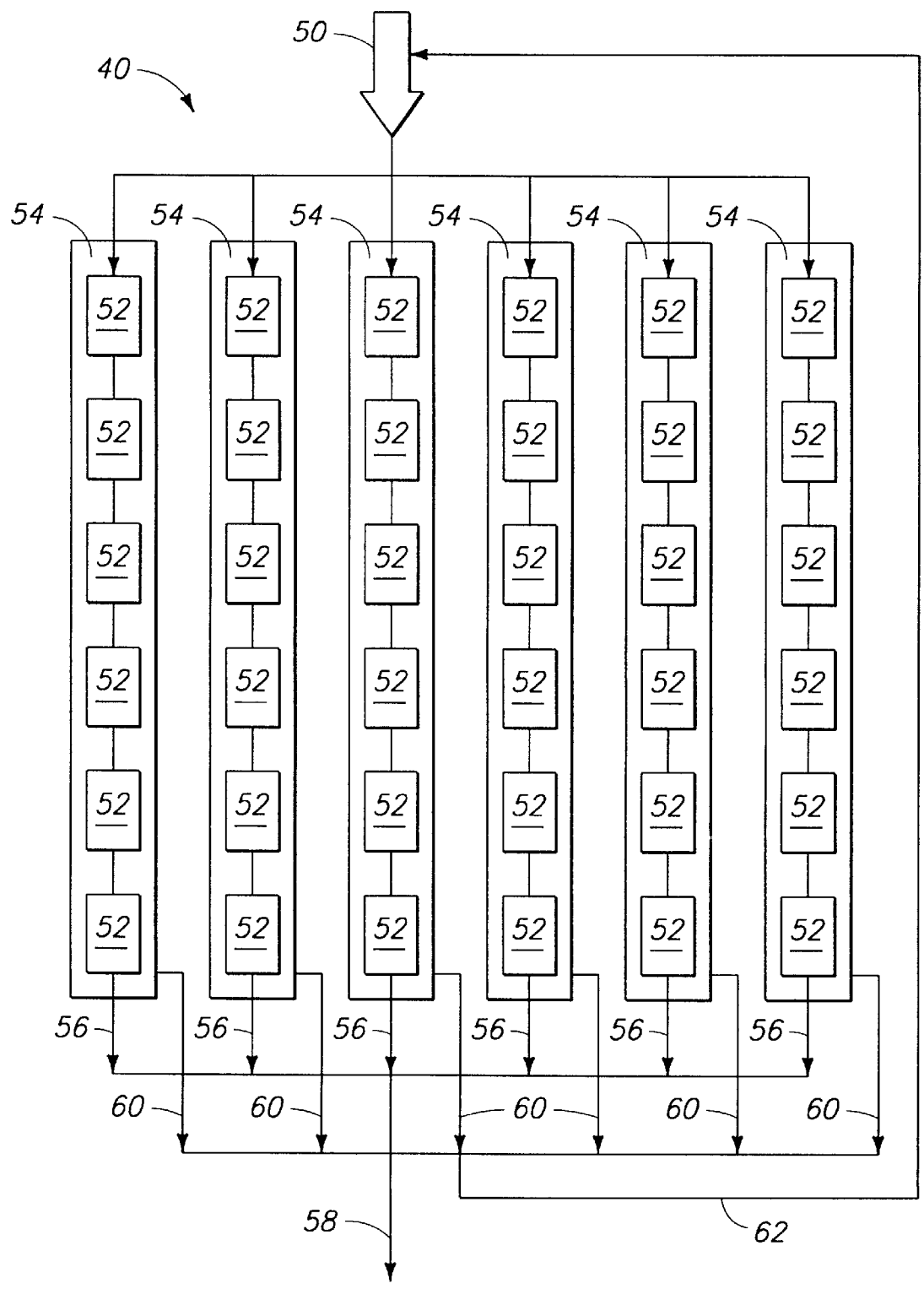
FIG. 3 is a schematic view of a process of the present invention.

A preferred nanofiltration step of the process illustrated in FIG. 2 is described in more detail with reference to FIGS. 3–5. Referring to FIG. 3, a nanofiltration apparatus 40 is shown. Nanofiltration apparatus 40 comprises a plurality of nanofiltration filter elements 52. Elements 52 can comprise, for example, the prior art filter element 10 described with reference to FIG. 1. Elements 52 are divided amongst a plurality of pressurized housings 54. In the shown embodiment, each of housings 54 contains six elements 52 arranged in series relative to one another. Further, each of the housings 54 is arranged in a parallel configuration relative to the other housing units 54.

A crude phosphoric acid feed solution 50 flows into nanofiltration apparatus 40. In the shown preferred embodiment, each housing 54 contains an identical number of filter elements as the other housings. In such preferable configuration, an equal amount of purification of crude phosphoric acid feed solution 50 occurs within each of housings 54.

Exit streams of purified phosphoric acid solutions 56 egress from the housings 54. Exit streams 56 are collected to form a single stream 58 of purified phosphoric acid solution. Also, exit streams of raffinate (refuse) solutions 60 egress from housings 54. Raffinate solutions 60 contain the impurities filtered from feed solution 50 in forming purified solutions 56. Also, raffinate solutions 60 can contain a substantial amount of phosphoric acid. Raffinate solutions 60 are pooled to form a single solution 62 which can then be either disposed of (not shown) or recycled into a crude acid feed solution 50 to be passed again through filter elements 52. In preferred embodiments, the raffinate solutions are repeatedly recycled into feed solution 50 to continue recovery of phosphoric acid from the raffinate solutions. However, eventually the level of contaminants within raffinate solution 62 becomes high enough relative to the amount of phosphoric acid that it is no longer economical to recycle the raffinate solutions. At this point, the raffinate solutions are disposed of rather than recycled. The impurity level which renders it uneconomical to recycle the raffinate solutions can vary depending on the type of contaminants present in the raffinate solution. It will be apparent to persons of ordinary skill in the art when it is not economical to recycle raffinate solutions.

Example operating conditions for the purification apparatus 40 are as follows. A flux through the elements is preferably from about 1 to about 6 gallons per square foot of membrane area per day at pressures of less than or equal to 1000 psig, and more preferably at least about 3 gallons per square foot of membrane area per day at pressures of less than 750 psig and temperatures of at least about 70° F. Preferred filter elements 52 are about 8 inches in diameter by about forty inches long. A cross-flow rate of feed solution 50 into filter elements 52 to achieve the desired flux is preferably from approximately 20 gallons per minute (gpm) to approximately 100 gpm, with from about 40 gpm to about 65 gpm being more preferred. The specific gravity of feed solution 50 is preferably from about 1.05 to 1.4, and more preferably from about 1.15 to about 1.25. A pressure within housing units 54 is preferably maintained at from about 600 psig to about 1000 psig, and a temperature of solution 50 within housing units 54 is preferably maintained from about 30° F. to about 90° F., and more preferably from about 65° F. to 90° F., and most preferably from about 70° F. to about 80° F.

It will be noted that the temperature of a method of the present invention is lower than prior art temperatures for flowing phosphoric acid solutions through nanofiltration membranes. As discussed in the "Background" section of this disclosure, a reason for the high prior art temperatures is to decrease a viscosity of a feed phosphoric acid solution. In methods of the present invention, a feed acid concentration can be lowered relative to prior art feed acid concentrations to keep a viscosity of a phosphoric acid treated in accordance with the present invention at a level which maintains acceptable flow rates through filter elements 52.

Averaged data from about 20 individual experimental runs of phosphoric acid solutions through a nanofiltration purification apparatus, conducted in accordance with the present invention, is listed in Table 1. Crude phosphate phosphoric acid solution 50 is referred to in Table 1 as "feed", and purified phosphoric acid solution 56 is referred to in Table 1 as "permeate".

TABLE 1

| COMPONENT | FEED | PERMEATE |
|---|---|---|
| % $P_2O_5$ | 20% | 18.50% |
| % F | 0.71% | 0.29% |
| % $SO_4$ | 1.67% | 1.25% |
| Al | 4400 | 66 |
| As | 7 | 7 |
| Ca | 350 | 17 |
| Cd | 120 | 7 |
| Co | 2 | 1 |
| Cr | 410 | 8 |
| Cu | 60 | 6 |
| Fe | 3500 | 27 |
| Hg | <0.1 | <0.1 |
| K | 433 | 195 |
| Mg | 3500 | 65 |
| Mn | 67 | 6.7 |
| Mo | 9 | 4 |
| Na | 133 | 67 |
| Pb | 33 | 3 |
| Se | <1 | <1 |
| Si | 300 | 30 |
| Sn | <1 | <1 |
| TOC | 183 | 110 |
| V | 800 | 40 |
| Zn | 1123 | 56 |

The percentages listed in Table 1 are percent of weight, and the values not listed as percentages are parts per million (ppm). The % $P_2O_5$ can be converted to a percentage of phosphoric acid (as $H_3PO_4$) by multiplying the % $P_2O_5$ by 1.38. Also, the values in Table 1 can be scaled to values based on 100% $P_2O_5$ by dividing the values by the % $P_2O_5$ and multiplying by 100. For instance, the Al concentration in the feed is 4400 ppm and the feed contains 20% $P_2O_5$. Thus the aluminum concentration is 22,000 ppm on a 100% $P_2O_5$ basis. The "TOC" in Table 1 refers to total organic carbon.

As can be seen in Table 1, the concentration of phosphate in the feed and permeate is roughly equivalent with the feed having about 20% $P_2O_5$ (about 28% phosphoric acid (as $H_3PO_4$)), and the permeate having about 18.5% $P_2O_5$ (about 25.5% phosphoric acid (as $H_3PO_4$)). The concentration of many of the contaminants within the permeate are reduced to 10% or less of their initial concentrations in the feed. For instance, the feed solution had greater than 3,400 ppm of each of aluminum, iron and magnesium (i.e., greater than 17,000 ppm on a 100% $P_2O_5$ basis), whereas the permeate has less than 300 ppm (i.e., less than 1621 ppm on a 100% $P_2O_5$ basis) of these elements. Additionally, the feed solution had greater than 700 ppm (i.e. greater than 3500 ppm on a 100% $P_2O_5$ basis) of each of vanadium and zinc, and the permeate comprises less than 60 ppm (i.e. less than 324 ppm on a 100% $P_2O_5$ basis) of each of vanadium and zinc. Further, the feed solution contained at least about 300 ppm of each of calcium and chromium (i.e. greater than 1500 ppm on a 100% $P_2O_5$ basis), and the permeate comprises less than about 20 ppm of each of calcium and chromium (i.e. less than 108 ppm on a 100% $P_2O_5$ basis).

A significant advantage of the process described above with reference to FIG. 3 relative to prior art processes is that polyamide-based filter membranes utilized in filtering apparatuses 52 will have longer useful lifetimes than they would in the prior art processes. For purposes of interpreting this disclosure and the claims that follow, a useful lifetime of a membrane is defined as the time over which the membrane maintains a minimum rejection/filtration efficiency for a particular key constituent. For example, a key constituent that is to be removed from many $P_2O_5$ solutions is vanadium. The required filtration efficiency for removing vanadium is frequently about a 90% rejection. Thus, a useful lifetime of a membrane designed for purifying $P_2O_5$ under such conditions would be defined as the time for which the membrane maintained about a 90% rejection of vanadium. The key constituent of choice for defining a useful lifetime can vary with feed acid composition (impurity levels), and product quality requirements. The useful lifetimes reported herein are defined as the times for which a 90% rejection of vanadium was maintained. The polyamide membranes utilized in the present invention will have useful lifetimes of 1,000 hours or more. Typically, the membranes utilized in a process of the present invention will have useful lifetimes of 2,000 hours or more, and frequently will have useful lifetimes of 3,000 hours or more. In contrast, membranes utilized in prior art processes typically had useful lifetimes of less than 300 hours.

Prior to this invention, it was thought that polyamide membranes degraded in phosphoric acid purification service due to mechanical abrasion of the membranes. Specifically, it was thought that if polyamide-based membranes were degrading prematurely it was because a crude phosphoric acid solution either had not been sufficiently filtered to remove particulates from the acid, or that particulates were forming during the membrane filtration process and that such particulates were abrading and thus damaging the fragile membrane surfaces. In accordance with the present invention, it has been discovered that the reduction in lifetime of the polyamide filters in phosphoric acid purification processes is not primarily due to abrasion of the membranes by particulates, but rather is due to chemical processes. Accordingly, the temperature of a nanofiltration process of the present invention is substantially reduced relative to temperatures utilized for nanofiltration filtration of phosphoric acid in prior art processes. Such reduction in temperature is found to prolong useful life of filtering membranes in processes of the present invention by from about two to at least about tenfold relative to the useful life of identically constructed membranes in prior art phosphoric acid purification processes.

Figure 4:
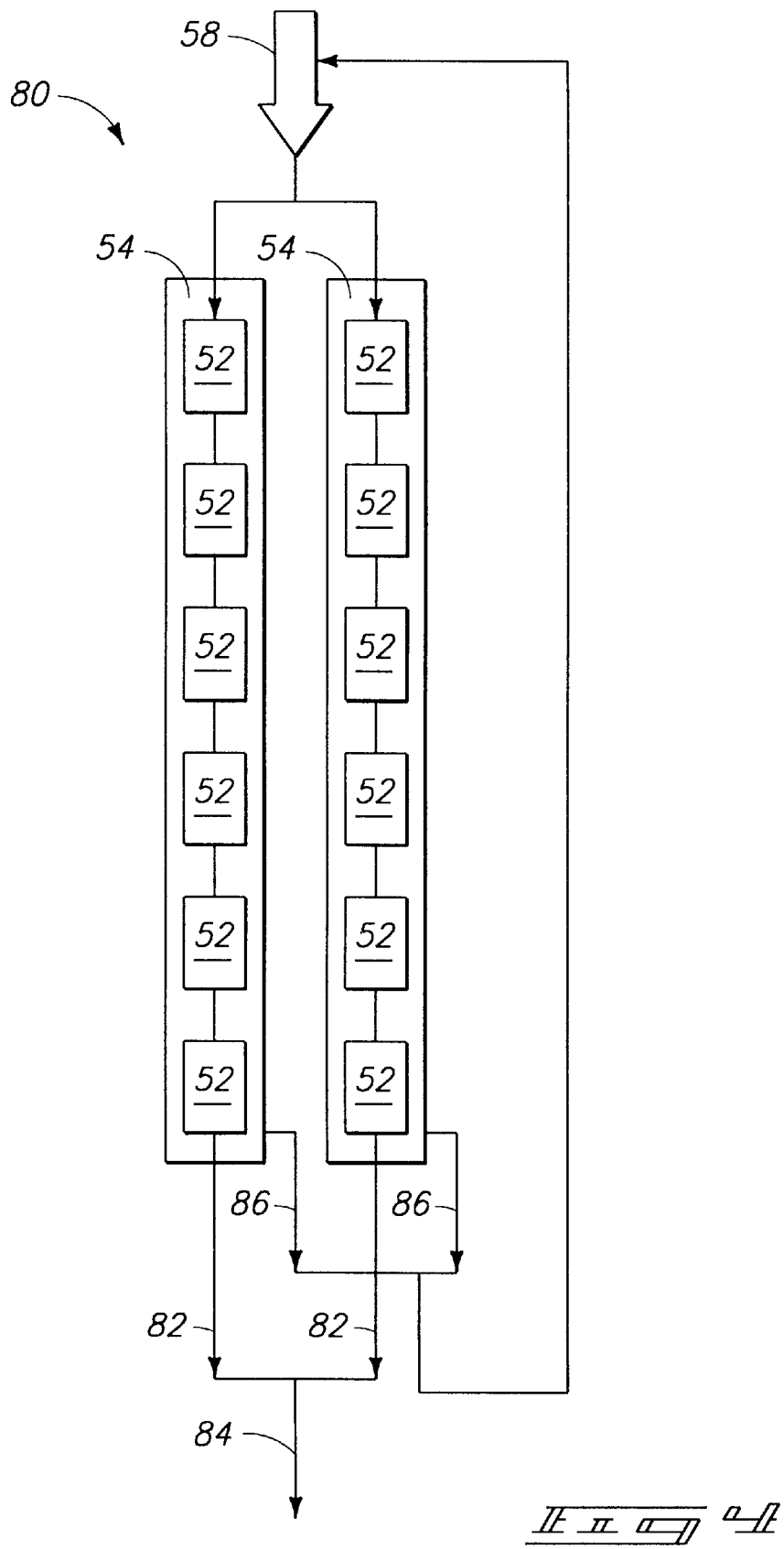
FIG. 4 is a schematic view of a process of the present invention.

Referring to FIG. 4, the purified phosphoric acid solution 58 exiting nanofiltration system 40 can be further purified by a second nanofiltration system 80. Second nanofiltration 80 is similar in construction to first nanofiltration 40 but comprises only two housing units 54. Accordingly, second nanofiltration apparatus 80 comprises only one-third as many filter elements 52 as does first nanofiltration apparatus 40. Second nanofiltration apparatus 80 can be constructed with fewer filter elements than first nanofiltration apparatus 40 because flux rates for the membranes processing the phosphoric acid solution with significantly reduced impurity levels are 2–3 fold higher due to reduced osmotic pressure and reduced acid viscosities.

Phosphoric acid solution 58 flows through the filters of nanofiltration apparatus 80 and a portion of phosphoric acid solution 58 exits housing units 54 as second purified phosphoric acid solutions 82. Second purified phosphoric acid solutions 82 are combined to form a single stream 84 of second purified phosphoric acid solution. A raffinate solution 84 exits housing units 54 and can be recycled to either feed stream 58 or feed stream 50 (shown in FIG. 3) to be recycled.

Operating conditions for second nanofiltration apparatus 80 comprise temperatures of from about 30° F. to 90° F., preferably from about 65° F. to 90° F., and more preferably from about 70° F. to about 80° F. A pressure within housing units 54 of second nanofiltration apparatus 80 is preferably maintained between about 600 psig and about 1000 psig, and a flow rate of solution 56 into apparatus 80 is preferably maintained at from about 90 gpm to about 120 gpm. A specific gravity of phosphoric acid solution 58 entering apparatus 80 is preferably maintained at from about 1.05 to 1.4, and more preferably from about 1.15 to about 1.25.

Table 2 lists data describing an amount of purification that can be accomplished by second nanofiltration apparatus 80. Specifically, Table 2 lists a number of components, and their relative concentrations in solution 58 (described as "feed" in Table 2) and solution 84 (described as "permeate" in Table 2). The units of the values in Table 2 are as discussed above regarding Table 1. The data in Table 2 is averaged from about 20 individual experiments.

TABLE 2

| COMPONENT | FEED | PERMEATE |
| --- | --- | --- |
| % $P_2O_5$ | 18.50% | 16.00% |
| % F | 0.71% | 0.11% |
| % $SO_4$ | 1.25% | 0.94% |
| Al | 165 | 12 |
| As | 7 | 7 |
| Ca | 42.5 | 2 |
| Cd | 17.5 | 1 |
| Co | 1 | 1 |
| Cr | 21 | 0.4 |
| Cu | 15 | 1 |
| Fe | 67.5 | 8 |
| Hg | <0.1 | <0.1 |
| K | 488 | 219 |
| Mg | 163 | 8 |
| Mn | 17 | 1 |
| Mo | 11 | 1 |
| Na | 167 | 83 |
| Pb | 8 | 1 |
| Se | <1 | <1 |
| Si | 75 | 7.5 |
| Sn | <1 | <1 |
| TOC | 138 | 83 |
| V | 100 | 5 |
| Zn | 140 | 7 |

As shown in Table 2, second nanofiltration apparatus 80 accomplishes about a tenfold reduction of a number of impurities present in phosphoric acid solution 58, including, for example, aluminum, calcium, cadmium, chromium, copper, manganese, molybdenum, vanadium and zinc.

Phosphoric acid solution 84 can be concentrated to form a relatively high purity phosphoric acid solution. Specifically, approximately 96% of the metallic impurities present in crude phosphoric acid solution 50 (shown in FIG. 3) have been removed through nanofiltration apparatuses 40 and 80. Phosphoric acid solution 84 can be acceptable for use in foliar and drip fertilizer applications.

Alternatively, phosphoric acid solution 84 can be passed through at least one more nanofiltration apparatus (not shown) to remove even more metallic contaminants. The conditions utilized in the additional nanofiltration apparatuses will be preferably be the same as those discussed above regarding second nanofiltration apparatus 80. Purification through a third nanofiltration apparatus forms a phosphoric acid solution in which over 99% of the metallic impurities present in crude phosphoric solution 50 are removed. After purification through a third nanofiltration apparatus, the phosphoric acid solution can be suitable for applications requiring very high purity phosphoric acid, such as water treatment and metal finishing, as well as in the production of a variety of sodium and potassium phosphates.

Figure 5:
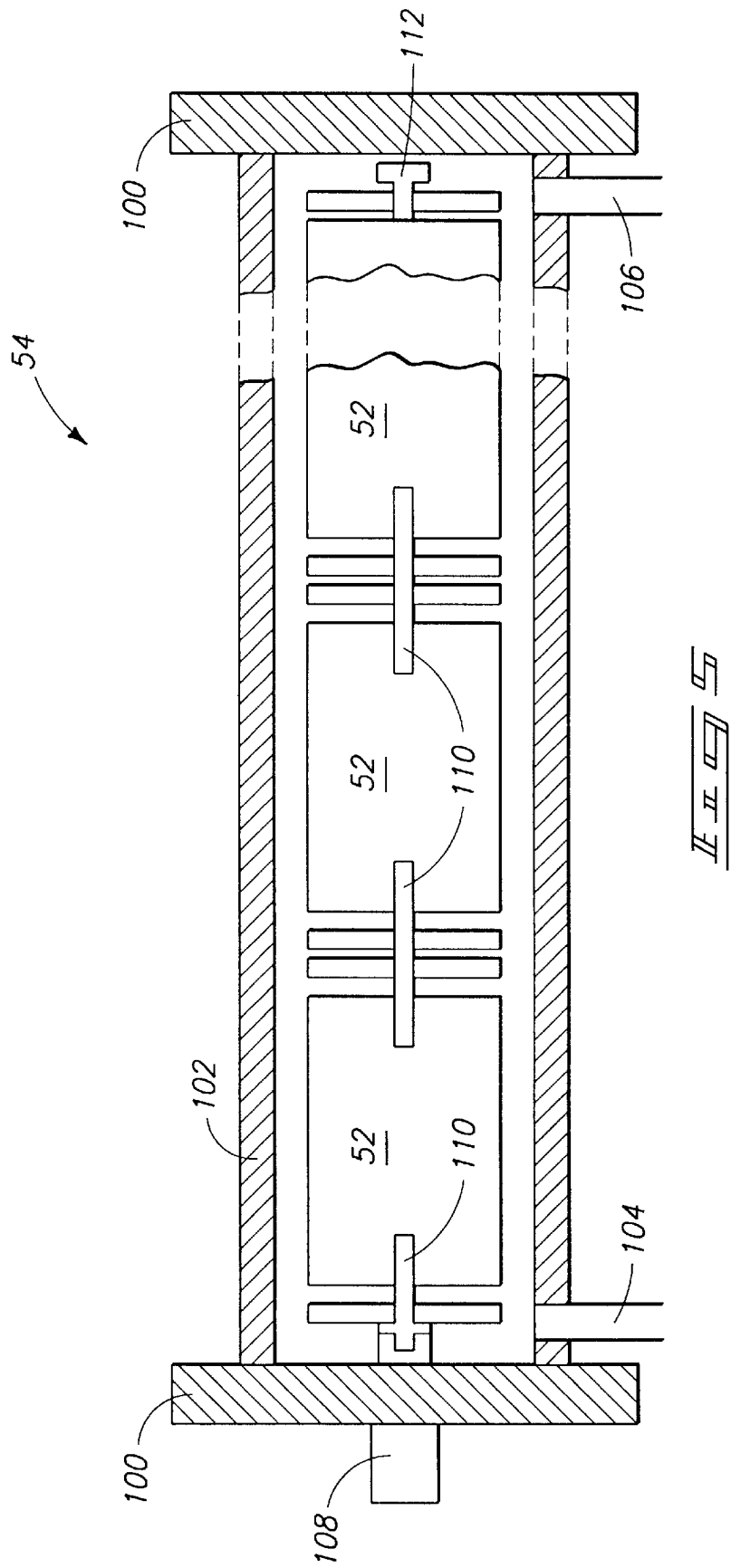
FIG. 5 is a diagrammatic, fragmentary, cross-sectional side view of a purification apparatus of the present invention.

An expanded, cross-sectional view of pressure housing 54, such as utilized in nanofiltration apparatus 40 (FIG. 3) or 80 (FIG. 4), is shown in FIG. 5. Housing 54 comprises a pressure vessel 102, and end caps 100 at opposing ends of the pressure vessel 102. Pressure vessel 102 and end caps 100 can be constructed of, for example, 316L stainless steel. Housing 54 comprises an inlet 104 for a phosphoric acid feed solution. The feed solution enters into housing 54 and contacts a series of filter elements 52. Filter elements 52 can comprise, for example, the prior art construction referred to in FIG. 1, and can be, for example, approximately eight inches in diameter and approximately forty inches long. Suitable filter elements are marketed as DK4040 and DK8040 by Desalination Systems, Inc. of Escondido, Calif., and as an NF45 series by Filmtec Membranes, which is a wholly owned subsidiary of the Dow Chemical Company.

Housing 54 further comprises an outlet 106 for expelling a raffinate solution from within housing 54. In the shown preferred embodiment, a feed solution flows counter current to a product solution exiting from outlet 108.

Filter elements 52 are connected by connectors 110, and an end of the series of filter elements 52 is plugged with an end plug 112. Connectors 110 and end plug 112 can comprise, for example, polysulfone or stainless steel.

A pressure is maintained within pressure housing 54 by injecting a pressurized feed solution into inlet 104, and by adjusting a flow rate from exit 106 to maintain the pressure within pressurized housing 54.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

New claims:

1. A method of purifying phosphoric acid by nanofiltration while prolonging the life of a nanofiltration membrane comprising passing a solution which contains the phosphoric acid through the nanofiltration membrane at a temperature of from about 30° F. to about 90° F.; the nanofiltration membrane having a longer useful life than it would if the temperature of the solution was greater than or equal to 110° F.

2. The method of claim 1 wherein the temperature is maintained from about 65° F. to 90° F.

3. The method of claim 1 wherein the temperature is maintained from about 70° F. to about 80° F.

4. The method of claim 1 wherein a pressure is maintained at from about 300 psig to about 2000 psig during the nanofiltration.

5. The method of claim 1 wherein a pressure is maintained at from about 600 psig to about 1000 psig during the nanofiltration.

6. The method of claim 1 wherein the nanofiltration membrane has a useful lifetime of greater than 1000 hours for filtering phosphoric acid solutions.

7. The method of claim 1 wherein the nanofiltration membrane has a useful lifetime of greater than 2000 hours for filtering phosphoric acid solutions.

8. The method of claim 1 wherein the nanofiltration membrane a useful lifetime of greater than 3000 hours for filtering phosphoric acid solutions.

9. A method of increasing a useful life of a membrane utilized for nanofiltration of a phosphoric acid solution, comprising:

provididing a feed solution of phosphoric acid, said feed solution comprising a metal ion impurity; and filtering the feed solution through a nanofiltration membrane to remove at least about 90% of the metal ion impurity; the feed soluton being maintained at a temperature of from about 30° F. to about 90° F. during the filtering; the nanofiltration membrane having a longer useful life than it would if the feed solution temperature was greater than or equal to 110° F.

10. The method of claim 9 wherein the temperature is maintained from about 65° F. to 90° F.

11. The method of claim 9 wherein the temperature is maintained from about 70° F. to about 80° F.

* * * * *

UNITED STATES PATENT AND TRADEMARK OFFICE
CERTIFICATE OF CORRECTION

PATENT NO : 5,945,000

DATED : August 31, 1999

INVENTOR(S) : Howard J. Skidmore et al.

It is certified that error appears in the above-identified patent and that said Letters Patent is hereby corrected as shown below:

Col. 1, line 61
 replace "solutiods"
 with --solutions--.

Col. 1, line 62
 replace "polyatnides"
 with --polyamides--.

Signed and Sealed this

Twenty-fifth Day of April, 2000

Attest:

Q. TODD DICKINSON

*Attesting Officer*     *Director of Patents and Trademarks*